United States Patent [19]

Grant et al.

[11] Patent Number: 4,527,499

[45] Date of Patent: Jul. 9, 1985

[54] ADJUSTABLE MAST STEP

[75] Inventors: Richard W. Grant; Ronald D. Sciulli, both of Honolulu, Hi.

[73] Assignee: Atecs Corporation, Honolulu, Hi.

[21] Appl. No.: 490,472

[22] Filed: May 2, 1983

[51] Int. Cl.³ .............................................. B63H 9/06
[52] U.S. Cl. ...................................... 114/39; 114/93; 114/204
[58] Field of Search .............................. 114/39, 90-93, 114/204, 102, 105, 109; 403/322, 326, DIG. 8; 74/512, 527, 529, 539, 542, 477; 292/252; 16/98; 81/177 G

[56] References Cited

U.S. PATENT DOCUMENTS

| 3,713,356 | 1/1973 | Knudsen | 81/177 G |
| 4,152,872 | 5/1979 | Tanizaki et al. | 16/98 |

FOREIGN PATENT DOCUMENTS

| 3017232 | 11/1981 | Fed. Rep. of Germany | 114/102 |
| 3107097 | 9/1982 | Fed. Rep. of Germany | 114/90 |
| 3115837 | 11/1982 | Fed. Rep. of Germany | 114/93 |
| 8218421 | 5/1983 | France | 114/90 |
| 57-30679 | 2/1982 | Japan | 114/105 |
| 79948 | 10/1955 | Netherlands | 292/252 |
| 979339 | 1/1965 | United Kingdom | 114/204 |

OTHER PUBLICATIONS

UK Patent Application: 4/1981, Ejiri.

Primary Examiner—Galen L. Barefoot
Assistant Examiner—Edwin L. Swinehart
Attorney, Agent, or Firm—James C. Wray

[57] ABSTRACT

A mast step is mounted on a traveler having two parallel linear bearings which ride in lateral grooves on a central track. The central track has downward enlarged vertical holes on 2-inch centers which hold detent balls. The detent balls are locked in their upper active position with a contact and lock the traveler in a preselected position. Depressing an operator pedal moves a slider bar within the track to align detent receivers with the openings in the track. As the detent balls drop into the receivers in the slider bar, the platform is released to move toward a new location. When the pedal is released, a spring tends to return the slider bar to misalign the receivers with the track openings. The detent balls are ramped upward out of the receivers into their upper operative position in contact with the downward opening locking recesses in the traveler.

15 Claims, 6 Drawing Figures

U.S. Patent  Jul. 9, 1985  4,527,499
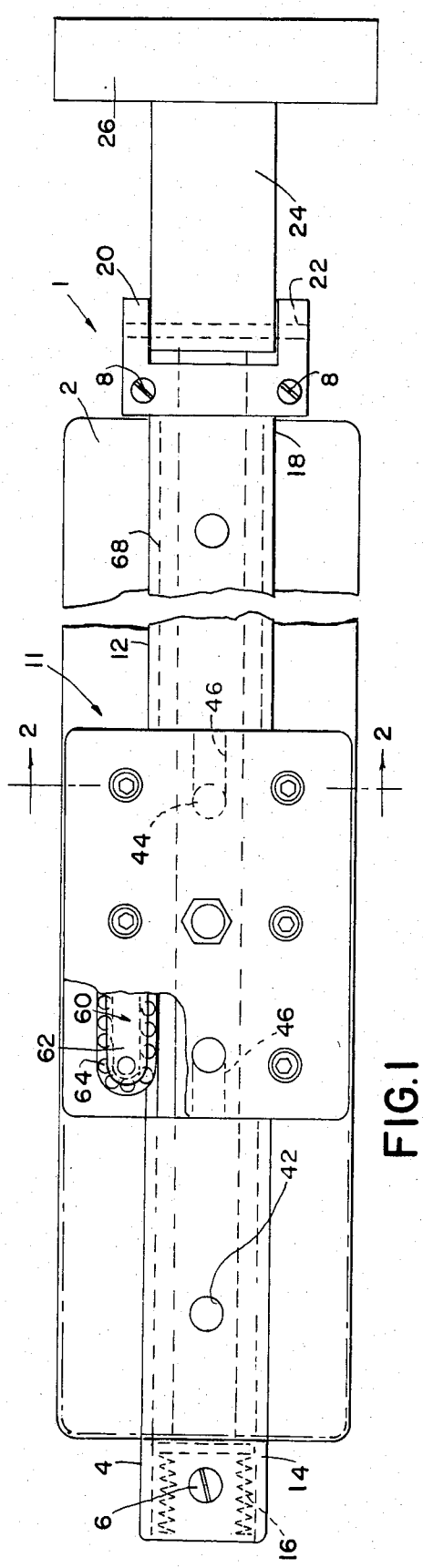
FIG.1
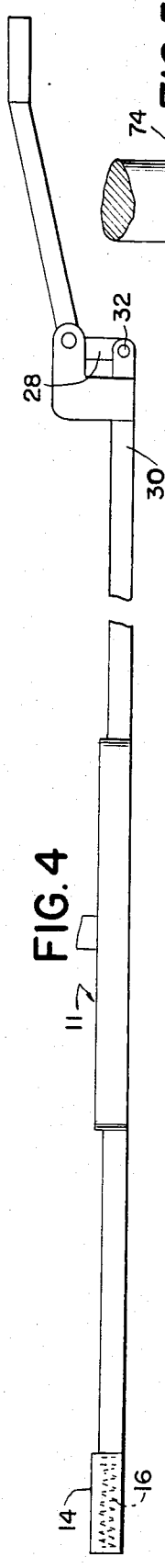
FIG.4
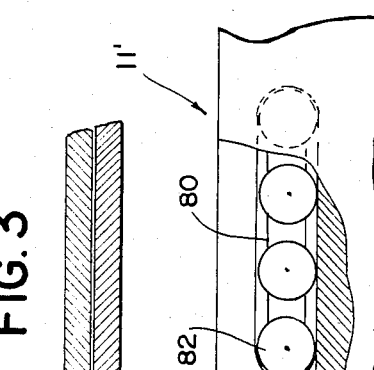
FIG.5
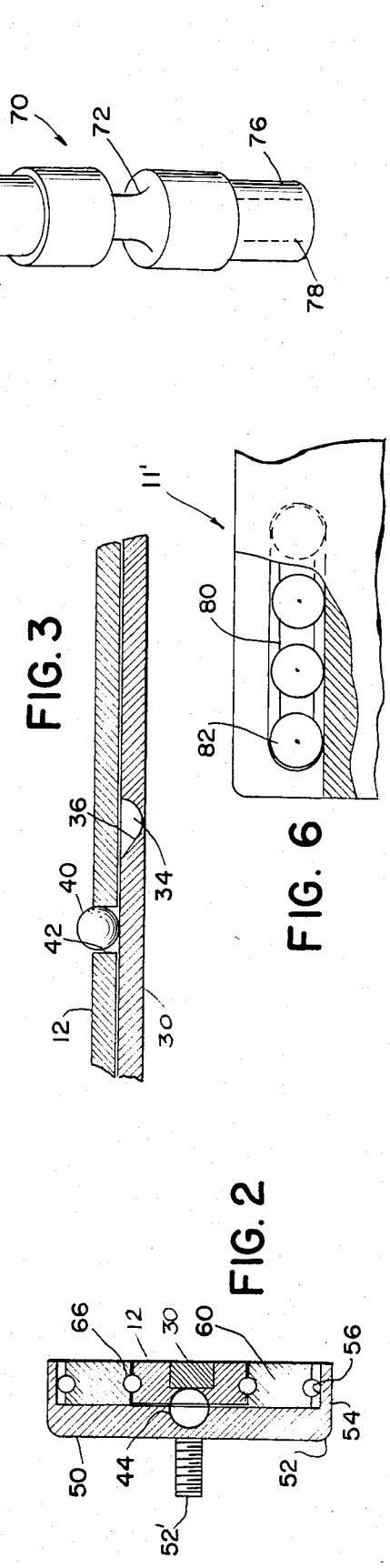
FIG.3
FIG.6
FIG.2

ADJUSTABLE MAST STEP

BACKGROUND OF THE INVENTION

Sailing performance may be maximized by adjusting the position of the mast step linearly along a sail-driven vehicle, particularly a sail board.

Shifting the mast step is useful when changing directions of travel and relative wind.

Adjusting the mast step adjusts the center of application of force from the mast to the craft. Repositioning the mast step is desirable when changing the sailed course from running before the wind to close-hauled courses or variations of angles of attack therebetween.

Adjusting the mast step may be useful in varying conditions of apparent wind velocity.

It is highly desirable to be able to change the mast step while underway and with minimum efforts or unusual movements.

SUMMARY OF THE INVENTION

The present invention fulfills the objectives of providing rapid and easy mast step adjustment with minimal efforts and movements required for the repositioning of the mast step.

While the invention is directed to repositionable mast steps, it will be obvious to those skilled in the art that the invention may be used with repositionable means of any type.

The device is intended as an adjustable mast step for sail boards. Using the device, it becomes simple to adjust the position of the mast step and the mast, which maximizes sailing performance. In one form of the invention, the mast step uses an adaptation of a linear ball bearing. A rail has detent positions every two inches. The detents comprise ball bearings which pop up and obstruct movement of the mast step traveler. The ball bearings are lowered by pressing on a foot pedal at one end of the track, which, in turn, moves a springloaded slider containing spherical receiver holes every two inches. The slider extends the entire length of the track. When pressure is released from the foot pedal, springs return the slider toward its detent-blocking position. Each receiver in the slider has a 45° angle ramp which cams each ball to an upper, operative position in the track.

In a preferred form of the invention, the mast traveler rides on ball bearings which recirculate. The ball bearings ride in semicircular races or guide ways on opposite sides of the track. The balls also circulate in oblong races housed in the traveler. The use of the ball bearings uniquely facilitates easy movement of the mast.

The mast is connected to the mast step by any conventional means. In said boarding, a universal joint conventionally connects the mast to the mast step. In one form of the invention, the lower half of a universal joint may be screwed onto a threaded stub on the mast step traveler. Alternatively, the lower half of a U-joint may be pinned or otherwise connected to the mast step traveler, or the step may comprise the lower half of a universal joint.

Alternatively, a mast may be screwed into a universal joint which is permanently connected to the mast step traveler.

The track means used in the present invention may be any suitable track along which a traveler can move. One or more connected or spaced parallel tracks may be employed. The track means is connected by connection means to the craft, usually a sail board. The track means may be connected directly to the surface of the craft or may be connected within a longitudinally extending recess formed in the surface. The connection means may comprise screws which connect the track means to the surface or bolts which connect the track means to plates embedded or otherwise anchored in the surface. The connection means may comprise any suitable anchoring means for the track.

The detent means of the present invention may be any suitable means for stopping the traveler at selected points along the track, either predetermined points or infinitely variable selected points along the track. In the latter case, the detents may take the form of brakes or clutches which stop and anchor the traveler in any position.

The detent means is positioned along the track. The detent means may be either connected to the track to engage complementary parts of the traveler, or the detent means may be connected to the traveler to engage complementary portions of the track.

The detent means may be extended along the track, either beside the track or spaced from the track or within the track.

In a preferred form of the invention, the detent means includes a slider bar which slides within an inverted U-shaped track and which controls the positioning of detent balls in operative positions extended upward from the track or in lowered positions within the track and slider bar.

The slider means in a preferred form of the invention includes the slider bar within the track and a receiver for receiving the detents which extend into the track.

The slider means may be mounted within the traveler and slidable therein between locking positions in which detents are forced into contact with the track and unlocking positions in which detents are permitted to move away from the track.

In a preferred form of the invention, the slider means include receiving means for receiving the detent abutments in an inoperative position. In the preferred form of the invention, the slider means also include cam means associated with the receiver means for camming the detent abutment means into locking position between the relatively movable traveler and track members.

The operator may comprise any convenient means. In a preferred embodiment of the invention, the operator is a bell crank which is pivoted in a base connected to a fixed position with respect to the slider bar. For example, when the slider bar is connected to the traveler, the base is connected to the traveler. When the slider bar is connected for sliding with respect to the track, the base of the operator may be connected to the track or to the craft on which the track is mounted. In a preferred embodiment, the operator base is connected to one end of the track.

The operator may be any operator which is suitable for sliding the slider. Preferably, a bell crank is provided with a pivot connected to the base. One end of the bell crank is connected to the slider, and the other end of the bell crank is provided with a pedal. Stepping on the pedal slides the slider, aligning the receivers and detent openings and releasing the detent abutments from operative contact between the track and traveler.

Adjustable mast step apparatus includes a track and connecting means connected to the track for connecting the track to a device on which the adjustable mast step apparatus is to be mounted. A traveler is connected to the track for moving along the track, and a mast step is connected to the traveler for mounting a mast on the traveler. Detents positioned adjacent the track are connectable to the traveler for securing the traveler in a selected position on the track.

In a preferred form, the detent further includes a slider connected to the track for sliding adjacent the track. The detent further includes abutments mounted in the track. The slider further includes receivers for receiving the abutments, whereby the abutments may be moved into the receivers and out of contact with the traveler.

Preferably, the receiver further includes cams for camming the abutments out of the receiver, into the track and into contact with the traveler to prevent movement of the traveler.

In preferred embodiments, return springs are connected to the slider so that the receivers are in misalignment with the abutments. Preferably, the operator has a base connected to the track and a pivot connected to the base. A bell crank connected to the slider and a pedal on a second arm for pivoting the bell crank around the pivot and sliding the slider to align the receivers with the abutments.

In a preferred embodiment, the track has an inverted U-shape, and the slider is a bar positioned within the U-shaped track. Plural openings in a center of the track are positioned for alignment with the receivers. The abutments are balls held within the openings and movable into the receivers when the receivers are aligned with the openings. The balls are extensible outward from the track in a direction opposite the slider when the receivers are misaligned with the openings. The traveler has downward opening recesses selectively aligned with the openings in the track for receiving part of the balls projecting outward from the track when the receivers are misaligned with the openings, for selectively fixing the traveler with respect to the track. The track has first and second oppositely opening guide ways respectively positioned on first and second opposite sides thereof, and the track has friction-reducing bearings connected to the traveler and extending partially into the guide ways. Lateral wings extend downward and surround the friction-reducing bearings.

A preferred method of repositioning an adjustable mast step includes stepping on a pedal, moving a slider and releasing detent abutments from engagement with a traveler, moving a traveler along a track to a new position on the track, releasing the pedal and moving the detents into contact with the traveler and preventing further motion of the traveler.

The step of releasing the detent abutments from contact with the traveler preferably includes sliding a sliding bar beneath a track and aligning receivers in the sliding bar with detent openings in the track. Detents move from a first operative upward position extended from the track to a second inoperative lower position within the track and the receiver. Releasing the pedal moves the detents, with cam surfaces on the receiver, upward out of the receiver through the track and into the upper operative position.

A spring returns the slider into a position of misalignment of the receivers and detent openings in the track.

These and further and other objects and features of the invention are apparent in the disclosure, which includes the specification with the above and ongoing description and claims and the drawings.

BRIEF DESCRIPTION OF THE DRAWINGS

FIG. 1 is a plan view of the adjustable mast step apparatus.

FIG. 2 is a cross-sectional view of the mast step apparatus taken along lines 2—2 of FIG. 1.

FIG. 3 is a detail of the track, slider bar and detent.

FIG. 4 is a side elevation of the adjustable mast step.

FIG. 5 is a detail of a universal joint for connection to the mast step shown in FIG. 2.

FIG. 6 is a detail of an alternate form of linear bearing which is useful between the slider and the track.

DETAILED DESCRIPTION OF THE DRAWINGS

Referring to FIG. 1, an adjustable mast step apparatus is indicated by the numeral 1. A recess 2 is provided in the surface of a sail board. Recess 2 is provided with extensions 4 to receive ends of the track structure, which are anchored to the sail board with screws 6 and 8.

A traveler 11 slides back and forth on track 12 while engaging linear bearings in grooves 14 formed on opposite sides of the track. At one end 18 of track 12, there is provided a mounting means 20 through which a pivot pin 22 extends. Pivot pin 22 is oriented transverse to track 12 and is spaced above the track in a horizontal plane. A bell crank 24 is pivoted on the pivot pin 22. One arm of bell crank 24 has a pedal mounted on the arm remote from the pivot pin 22. The other arm 28 of bell crank 24 is connected to a pivot pin 32, which is connected to a slider 30 mounted beneath the U-shaped track 12.

As shown in FIGS. 2 and 3, the slider 30 has openings 34 with ramps 36 which urge balls 40 upward within openings 42 in track 12. Openings 44 in traveler 11 receive upper portions of detent balls 40 and lock the traveler in place when slider 30 misaligns openings 34 with openings 42 in track 12.

In a preferred form of the invention, as shown in FIGS. 1 and 2, the traveler 11 has a flat upper surface 50 with rounded corners 52 and sides 54 which extend downward around track 12. End sides 56 of traveler sides 54 form race ways for linear bearings 60. As shown in FIG. 1, the linear bearing 60 comprises bodies 62 which are bolted to traveler 11 with three bolts and ball bearings 64 which move in race ways between grooves in the linear bearings 60 and complementary grooves 14 in sides of track 12.

As shown in FIGS. 2 and 5, the mast step 52' receives a universal joint mast fitting 70 which has a central portion 72 which may flex in any direction. Lower portion 76 has internal threads 78 for receiving the threads on the mast step of 52. 74 generally represents the lower portion of the mast.

As shown in FIG. 6, the linear bearing 60 may be replaced by a bearing assembly 80 which includes wheels 82 mounted on vertical axles fixed in the bearing 80 and in the traveler 11'. The wheels 82 ride in grooves 14 in the side walls of track 12.

While the invention has been described with reference to specific embodiments, modifications and variations of the invention may be constructed without departing from the scope of the invention. The scope of the invention is defined in the following claims.

We claim:

1. Adjustable mast step apparatus, comprising track means, connecting means connected to the track means for connecting the track means to a device on which the adjustable mast step apparatus is to be mounted, traveler means connected to the track means for moving along the track means, mast step means connected to the traveler means for mounting a mast step on the traveler means, detent means positioned adjacent to track means and connectable to the traveler means for securing the traveler means in a selected position on the track means, wherein said detent means is provided with slider means connected to said track means for sliding adjacent to said track means, and wherein said detent means is provided with abutment means mounted in said track means and wherein the slider means further comprises receiver means for receiving the abutment means, whereby the abutment means may be moved into the receiver means and out of contact with the traveler means, operator means connected to said slider means for moving said slider means and tending to align said receiver means with said abutment means, wherein said operator means has a base connected to the track, a pivot connected to the base, a bell crank connected to the pivot, and having a first arm connected to the slider means and having a second arm with a pedal on the second arm for pivoting the bell crank around the pivot and sliding the slider means to align the receiver means with the abutment means.

2. The adjustable mast step apparatus of claim 1 wherein the receiver means further comprises cam means for camming the abutment means out of the receiver means and into the track means and into contact with the traveler means to prevent movement of the traveler means.

3. The adjustable mast step apparatus of claim 1 further comprising return means connected to the slider means so that the receiver means is in misalignment with the abutment means.

4. The adjustable mast step apparatus of claim 1 wherein the track means has first and second oppositely opening guide ways respectively positioned on first and second opposite sides thereof and wherein the track means has friction-reducing bearing means connected to the traveler means and extending partially into the guide ways.

5. The adjustable mast step apparatus of claim 4 wherein the traveler has lateral wings which extend downward and surround the friction-reducing bearing means.

6. The step apparatus of claim 1 wherein the track has opposite grooves and wherein the traveler has first and second linear bearings extending into the opposite grooves.

7. Adjustable step apparatus comprising a track, a traveler connected to the track for moving along the track, a step connected to the traveler, a slider mounted for movement along the track, first, second and third openings in the traveler, the track and the slider respectively, detents positioned in the second openings within the track and movable in a first direction to engage first openings in the traveler and movable in a second direction to engage third openings in the slider and a shifting means connected to the slider for sliding the slider with respect to the track and selectively aligning and misaligning the third openings with the second openings.

8. The adjustable step apparatus of claim 7 wherein the shifter comprises a bell crank having a pivot connected to the track, having a first arm connected to the slider and having a pedal mounted on a second arm remote from the pivot.

9. The adjustable step apparatus of claim 8 wherein the shifter further comprises return spring means connected to the slider for moving the slider so that the second and third openings are misaligned.

10. The adjustable step apparatus of claim 7 wherein the detents comprise balls retained within the second openings and partially extensible therefrom into the first openings.

11. The adjustable step apparatus of claim 10 wherein the slider is positioned beneath the track so that the balls fall into the third openings when the third openings are aligned with the second openings and wherein the third openings comprise camming means for camming the balls upward out of the third openings when the slider is moved to misalign the third openings with the second openings.

12. The adjustable step apparatus of claim 7 wherein the track has first and second opposite linear grooves in opposite sides thereof and wherein the traveler has first and second parallel series of vertically aligned axles spaced outwardly from the grooves on opposite sides of the track and further comprising wheels mounted on the axles and extending into the grooves to hold the traveler on the track and to move the traveler therealong.

13. The method of repositioning an adjustable mast step comprising stepping on a pedal, moving a slider and releasing detent abutments from engagement with a traveler, moving a traveler along a track to a new position on the track, releasing the pedal and moving the detents into contact with the traveler and preventing further motion of the traveler, wherein the step of releasing the detent abutments from contact with the traveler comprises sliding a sliding bar beneath a track and aligning receivers in the slider bar with detent openings in the track, whereby detents move from a first operative upward position extended from the track to a second inoperative lower position within the track and the receiver and wherein the releasing of the pedal further comprises camming the detents with cam surfaces on the receiver upward out of the receiver through the track and into the upper operative position.

14. The method of claim 13 further comprising returning the slider into a position of misalignment of the receivers and detent openings in the track with a spring.

15. Adjustable mast step apparatus comprising track means, connecting means connected to the track means for connecting the track means to a device on which the adjustable mast step apparatus is to be mounted, traveler means connected to the track means for moving along the track means, mast step means connected to the traveler means for mounting a mast on the traveler means, detent means positioned adjacent the track means and connectable to the traveler means for securing the traveler means in a selected position on the track means, wherein the detent means further comprises a slider means connected to the track means for sliding adjacent the track means, and wherein the detent means further comprises abutment means mounted in the track means and wherein the slider means further comprises a receiver means for receiving the abutment means, whereby the abutment means may be moved into the receiver means and out of contact with the traveler means, wherein the track means has an inverted U shape and wherein the slider means comprises a bar positioned within the U shaped track means, wherein the track means further comprises plural openings in a center of the track positioned for alignment with the receiver means, and wherein the abutment means comprise balls held within the openings and moveable into the receiver means when the receiver means are aligned with the openings, and extensible outward from the track means in a direction opposite the slider means when the receiver means are misaligned with the openings, and wherein the traveler means comprises downward opening recesses selectively aligned with the openings in the track means for receiving part of the abutment means projecting outward from the track means when the receiver means is misaligned with the openings, for selectively fixing the traveler means with respect to the track means.

* * * * *